US011498297B2

(12) United States Patent
So (10) Patent No.: US 11,498,297 B2
(45) Date of Patent: Nov. 15, 2022

(54) TIRE INTEGRATED WITH ELECTRONIC DEVICE AND MANUFACTURING METHOD THEREOF

(71) Applicant: HANKOOK TIRE & TECHNOLOGY CO., LTD, Seongnam-si (KR)

(72) Inventor: Soon Hong So, Daejeon (KR)

(73) Assignee: HANKOOK TIRE & TECHNOLOGY CO., LTD, Seongnami-si (KR)

( * ) Notice: Subject to any disclaimer, the term of this patent is extended or adjusted under 35 U.S.C. 154(b) by 286 days.

(21) Appl. No.: 16/913,464

(22) Filed: Jun. 26, 2020

(65) Prior Publication Data

US 2020/0406564 A1    Dec. 31, 2020

(30) Foreign Application Priority Data

Jun. 28, 2019    (KR) .......................... 10-2019-0078104

(51) Int. Cl.
*B29D 30/00* (2006.01)
*H04W 4/80* (2018.01)
*B60C 19/00* (2006.01)
*G06K 19/077* (2006.01)

(52) U.S. Cl.
CPC .......... *B29D 30/0061* (2013.01); *B60C 19/00* (2013.01); *G06K 19/07764* (2013.01); *H04W 4/80* (2018.02); *B29D 2030/0077* (2013.01); *B60C 2019/004* (2013.01)

(58) Field of Classification Search
CPC ..... B29D 30/0061; H04W 4/80; B60C 19/00; G06K 19/07764

USPC ......................................................... 152/450
See application file for complete search history.

(56) References Cited

U.S. PATENT DOCUMENTS

| | | | |
|---|---|---|---|
| 9,583,357 B1 | 2/2017 | Drewery et al. | |
| 2016/0107490 A1* | 4/2016 | Randall | B60C 15/0009 156/131 |
| 2020/0148012 A1* | 5/2020 | Hosomi | B60C 15/06 |
| 2020/0148016 A1* | 5/2020 | Nagayoshi | B60C 19/00 |
| 2020/0180366 A1* | 6/2020 | Nakajima | B60C 19/00 |
| 2020/0353780 A1* | 11/2020 | Suita | B60C 23/0493 |
| 2020/0389616 A1* | 12/2020 | Grot | H04N 5/37452 |
| 2020/0406564 A1* | 12/2020 | So | G06K 19/07764 |
| 2021/0070113 A1* | 3/2021 | Yoshizumi | B60C 19/00 |
| 2021/0178836 A1* | 6/2021 | Spencer | H01L 23/5387 |
| 2021/0271951 A1* | 9/2021 | Moon | G06K 19/07764 |

(Continued)

FOREIGN PATENT DOCUMENTS

| | | |
|---|---|---|
| CN | 101734112 A | 6/2010 |
| CN | 104589928 A | 5/2015 |

(Continued)

OTHER PUBLICATIONS

Ip.com.*

*Primary Examiner* — Allyson N Trail
(74) *Attorney, Agent, or Firm* — Bridgeway IP Law Group, PLLC; Jihun Kim (57) ABSTRACT

A tire integrated with an electronic device includes the electronic device attached to an inner liner or a side wall of the tire by vulcanization. The electronic device is attached to an inner side or an outer side of an end of a bead filler depending on a length of the bead filler not to reduce durability of the tire.

11 Claims, 7 Drawing Sheets

(56) References Cited

U.S. PATENT DOCUMENTS

2021/0354411 A1* 11/2021 Uijlenbroek ..... G06K 19/07764
2022/0088974 A1* 3/2022 Pedrinelli ................ B60C 5/14
2022/0126633 A1* 4/2022 Hosomi ............. B60C 15/0036

FOREIGN PATENT DOCUMENTS

| CN | 106794648 A | 5/2017 |
| CN | 107160960 A | 9/2017 |
| JP | 2005-216077 A | 8/2005 |

\* cited by examiner

TIRE INTEGRATED WITH ELECTRONIC DEVICE AND MANUFACTURING METHOD THEREOF

BACKGROUND OF THE INVENTION

Field of the Invention

The present invention relates to a tire integrated with an electronic device and a manufacturing method thereof, and more specifically, to a tire integrated with an electronic device provided not to reduce durability of the tire and a manufacturing method of the tire integrated with an electronic device.

Description of the Related Art

Recently, an increase of technology development of connected cars, self-driving cars, or the like brings about active research on a technology for attaching an electronic device to a tire.

However, in the related art, in a process of attaching an electronic device to a tire, problems of a durability reduction of the tire and complication of processes arise, and a problem of detachment of the electronic device due to deformation of the tire arises.

For example, Japanese Patent Publication No. 2005-216077 proposes a method for attaching RFID topped with a rubber member or the like to a surface of a tire using an adhesive, the rubber member or the like being imprinted with a barcode; however, the method has problems in that detachment can easily occur due to a decrease in adhesion of the adhesive, and there is also a high possibility of detachment due to a decrease in adhesion by deformation of the tire.

Chinese Patent No. 104589928 proposes a method for collecting data by inserting an electronic device between a belt and a side wall or inserting the electronic device inside a tire inner liner in a method of inserting an electronic device inside the tire. However, an insertion position is limited to a position between a bead and a carcass, and thus when the electronic device is inserted inside the tire, an air layer can be formed between an RFID PCB and rubber. In this case, a problem arises in that the air layer increases in size and affects durability of the tire.

Chinese Patent Publication No. 107160960 proposes a method for providing information of a tire by attaching a topped RFID on a surface of a tire and connecting the RFID to a tire surface temperature measuring device. However, in the method, an electronic device is integrated with the tire at a side closer to a bead, the electronic device is inserted into a portion which is turned up to have a height, and thus there is a possibility that the electronic device will project to cause a defect of an external appearance. In addition, the electronic device is inserted to a portion at the side closer to the bead and receives a direct force of a tire mounting/demounting tool during mounting and demounting of the tire, and thus there is a high possibility that the electronic device will be damaged.

In Chinese Patent Publication No. 106794648, an electronic device is located at a position separated from an end of a bead filler inside a tire and is located between a side wall and a shoulder. The electronic device is inserted inside the tire except for a position of the end of the bead filler which disadvantageously affects the durability; however, in a method of inserting the electronic device inside the tire, there is a possibility that an RFID PCB will not be integrated with the tire, so bubbles are generated, and the bubbles can have a bad influence on the durability of the tire.

As described above, technologies of integrating an electronic device with a tire in the related art have problems of a durability reduction of the tire and a decrease in durability of the electronic device.

SUMMARY OF THE INVENTION

Objects of the invention to solve the above-described problems are to provide a tire integrated with an electronic device provided not to reduce durability of the tire and a manufacturing method of the tire integrated with an electronic device.

Technical objects to be achieved by the invention are not limited to the technical objects mentioned above, and the following description enables other unmentioned technical objects to be clearly understood by a person of ordinary skill in the art to which the invention belongs. According to a configuration of the invention to achieve an object described above, there is provided a tire integrated with an electronic device in which the electronic device is attached to an inner liner or a side wall of the tire by vulcanization. The electronic device is attached to an inner side or an outer side of an end of a bead filler depending on a length of the bead filler.

In an embodiment of the invention, the electronic device may be configured of RFID completely surrounded by a topping member. The topping member may be made of the same material as that of a portion at which the RFID is attached, or the topping member may be made of a polymer material.

In the embodiment of the invention, the electronic device may be attached at a position of the inner liner or the side wall at which contact shear strength is the lowest.

In the embodiment of the invention, the electronic device may be attached to the inner side of the end of the bead filler, when the bead filler has a length of 30 mm or longer.

In the embodiment of the invention, the electronic device may be attached at a height of 45% to 85% from the end of the bead wire of the tire.

In the embodiment of the invention, the electronic device may be attached at the outer side of the end of the bead filler, when the bead filler has a length of shorter than 30 mm.

In the embodiment of the invention, the electronic device may be attached at a height of 200% to 500% from the end of the bead wire of the tire.

According to a configuration of the invention to achieve another object described above, there is provided a manufacturing method of the tire integrated with an electronic device, including: a) a step of preparing the electronic device; b) a step of attaching the electronic device to the inner liner or the side wall; and c) a step of integrating the electronic device with the inner liner or the side wall by vulcanizing the tire. The electronic device is attached to the inner side or the outer side of the end of the bead filler depending on a length of the bead filler.

In the embodiment of the invention, wherein, the step of a) may include: a1) a step of preparing a topping member; and a2) a step of covering and topping RFID with the topping member from one end to the other end of the RFID in order. The topping member may be made of the same material as that of a portion at which the RFID is attached, or the topping member may be made of a polymer material.

In the embodiment of the invention, in the step of b), the electronic device may be attached at a portion of the inner liner or the side wall at which contact shear strength is the lowest.

In the embodiment of the invention, the step of b) may include: b1) a step of attaching the electronic device to the inner side of the end of the bead filler, when the bead filler has a length of 30 mm or longer; and b2) a step of attaching the electronic device to the outer side of the end of the bead filler, when the bead filler has a length of shorter than 30 mm.

In the embodiment of the invention, in the step of b1), the electronic device may be attached at a height of 45% to 85% from the end of the bead wire of the tire.

In the embodiment of the invention, in the step of b2), the electronic device may be attached at a height of 200% to 500% from the end of the bead wire of the tire.

According to a configuration of the invention to achieve the other object described above, there is provided a tire integrated with an electronic device in which the electronic device is attached inside the tire by vulcanization at a molding step. The electronic device is attached to an inner side or an outer side of an end of a bead filler depending on a length of the bead filler.

DETAILED DESCRIPTION OF THE PREFERRED EMBODIMENTS

Hereinafter, the invention will be described with reference to the accompanying drawings. However, the invention can be realized as various different embodiments, thus not being limited to embodiments described here. Besides, parts irrelevant to the description are omitted from the drawings in order to clearly describe the invention, and similar reference signs are assigned to similar parts through the entire specification.

In the entire specification, a case where a certain part "is connected to (accesses, is in contact with, or is coupled to)" another part includes not only a case where the parts are "directly connected" to each other, but also a case where the parts are "indirectly connected" to each other with another member interposed therebetween. In addition, a case where a certain part "includes" a certain configurational element means a case where another configurational element is not excluded but can be further included, unless specifically described otherwise.

Terms used in this specification are only used to describe a specific embodiment and are not intentionally used to limit the invention thereto. A word having a singular form contain a meaning of its plural form, unless obviously implied otherwise in context. In this specification, words such as "to include" or "to have" are construed to specify that a feature, a number, a step, an operation, a configurational element, a member, or a combination thereof described in the specification is present and not to exclude presence or a possibility of addition of one or more other features, numbers, steps, operations, configurational elements, members, or combinations thereof in advance.

Hereinafter, embodiments of the invention will be described in detail with reference to the accompanying drawings.

Figure 1:
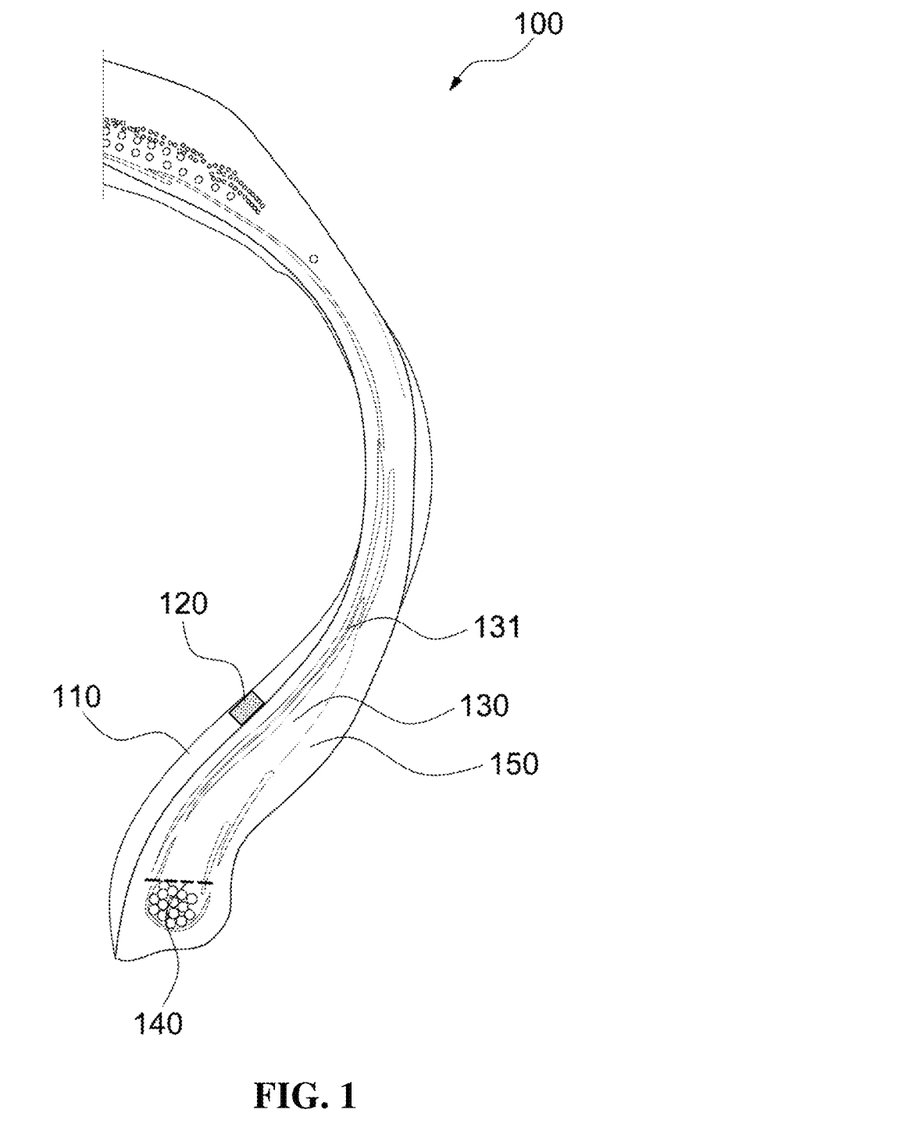
FIG. 1 is a view illustrating a tire integrated with an electronic device according to an embodiment of the invention.
Figure 2:
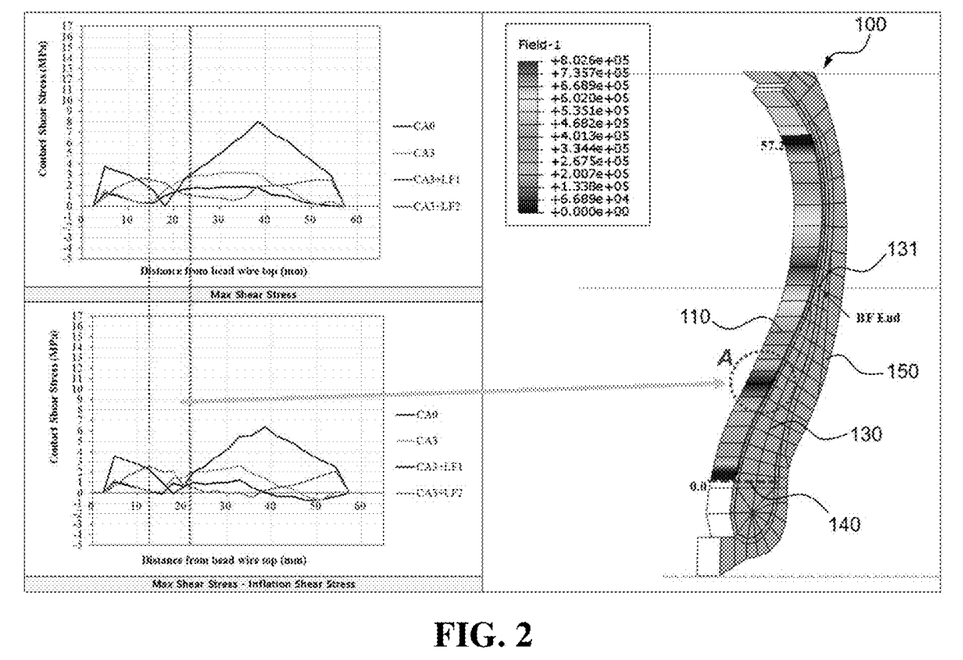
FIG. 2 illustrates a distribution diagram of shear stress of a 255/40R20 tire according to the embodiment of the present invention.
Figure 3:
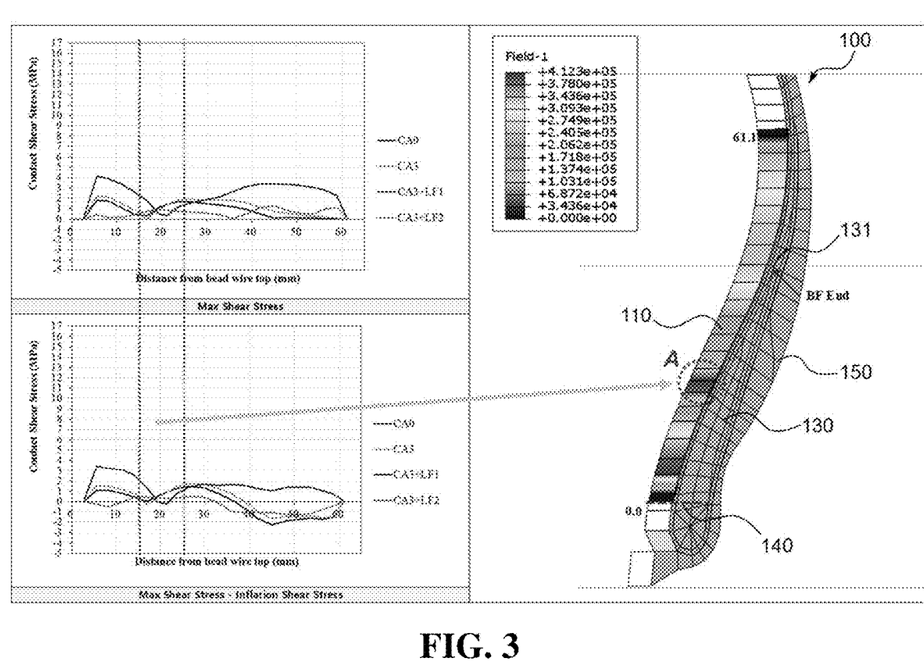
FIG. 3 illustrates a distribution diagram of shear stress of a 285/35R19 tire according to the embodiment of the present invention.

FIG. 1 is a view illustrating a tire integrated with an electronic device according to an embodiment of the invention, FIG. 2 illustrates a distribution diagram of shear stress of a 255/40R20 tire according to the embodiment of the present invention, and FIG. 3 illustrates a distribution diagram of shear stress of a 285/35R19 tire according to the embodiment of the present invention.

As illustrated in FIGS. 1 to 3, a tire 100 integrated with an electronic device includes an inner liner 110, an electronic device 120, a bead filler 130, a bead wire, and a side wall 150.

The electronic device 120 can be attached to and integrated with the inner liner 110 or the side wall 150 by vulcanization.

The electronic device 120 can be attached to an inner side or an outer side of an end of the bead filler 130 depending on a length of the bead filler 130.

The electronic device 120 can be configured of RFID completely surrounded by a topping member. The topping member can be made of the same material as that of a portion at which the RFID is attached, or the topping member can be made of a polymer material.

Specifically, when the electronic device 120 is attached to the inner liner 110, the topping member can be made of the same material as that of the inner liner 110 or a polymer material. Besides, when the electronic device 120 is attached to the side wall 150, the topping member can be made of the same material as that of the side wall 150 or a polymer material.

The topping member provided as described above enables the electronic device 120 to be more firmly integrated with the tire during vulcanization.

The RFID can be a spring antenna type RFID or a film type RFID; however, a type of RFID is not limited thereto.

In addition, the RFID can use a bandwidth of 850 MHz to 950 MHz; however, the frequency bandwidth is not limited thereto.

The electronic device 120 can be attached at a portion of the inner liner 110 or the side wall 150 at which contact shear strength is the lowest.

Specifically, the electronic device 120 can be attached to the inner side of an end 131 of the bead filler, when the bead filler 130 has a length of 30 mm or longer.

At that time, as illustrated in FIGS. 2 and 3, the electronic device 120 can be attached at a height of 45% to 85% from the end 140 of the bead wire of the tire at which the contact shear strength is the lowest. Alternatively, as illustrated in FIGS. 2 and 3, the electronic device 120 can be attached at a height of 15 mm to 26 mm from the end 140 of the bead wire of the tire at which the contact shear strength is lowest.

Figure 4:
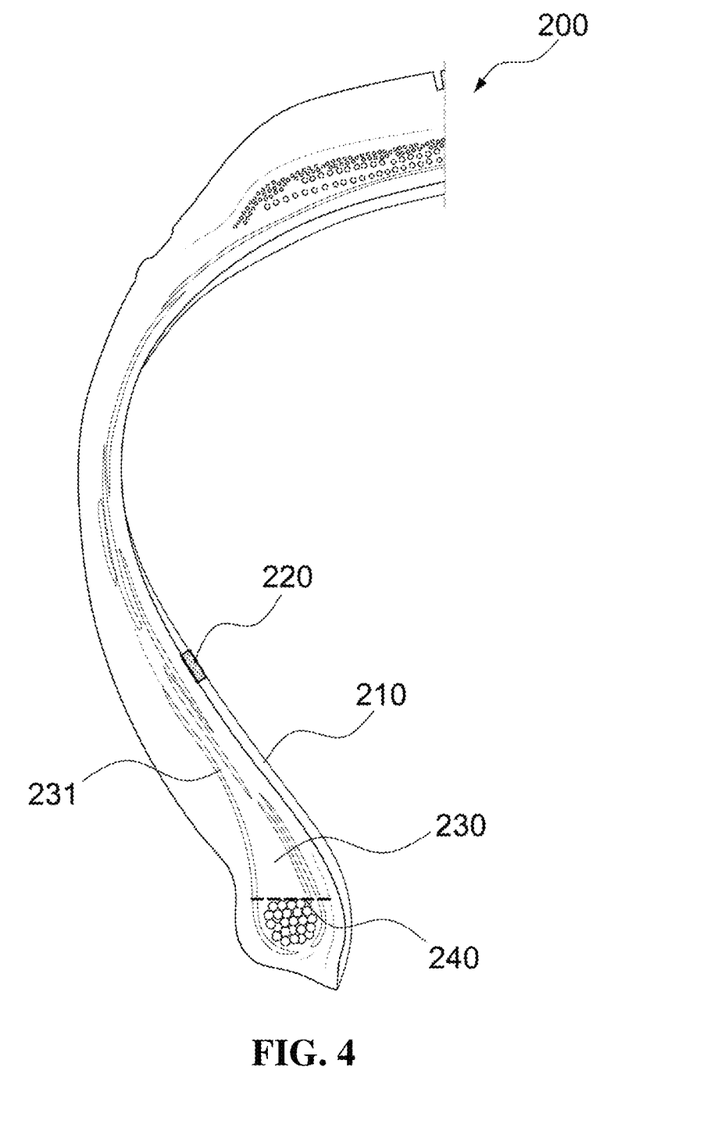
FIG. 4 is a view illustrating a tire integrated with an electronic device according to another embodiment of the invention.
Figure 5:
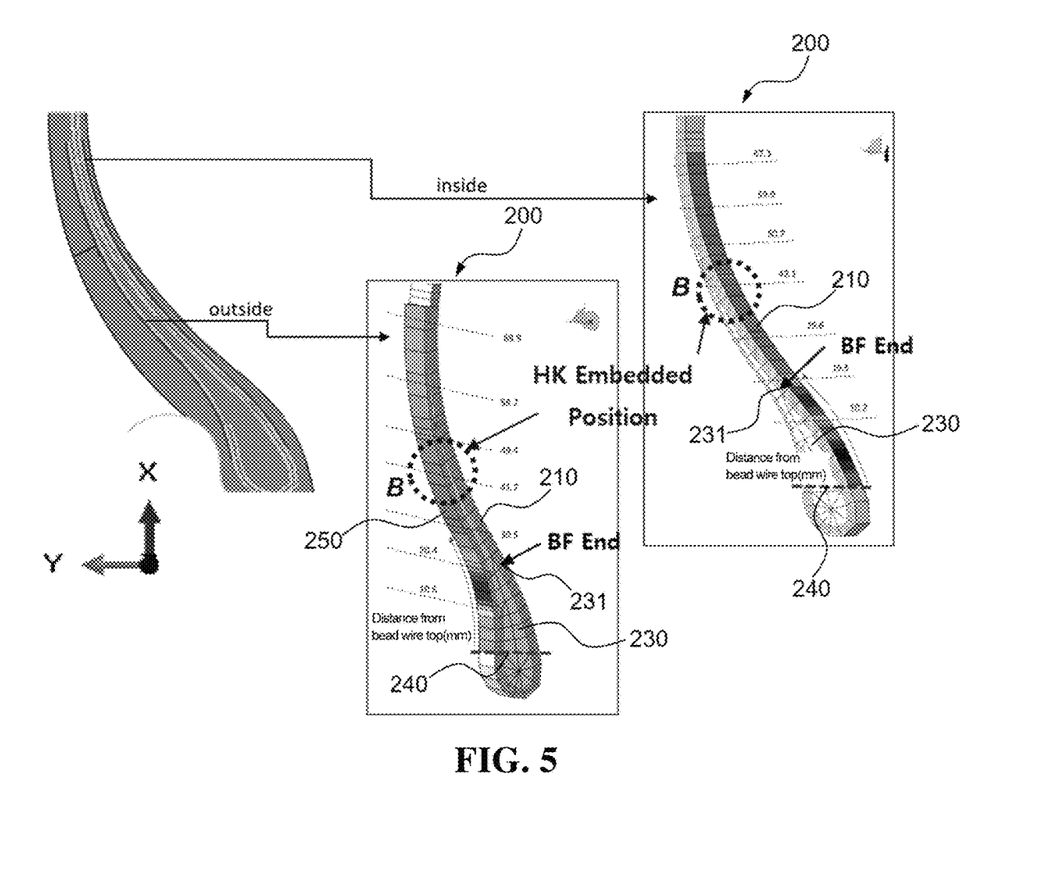
FIG. 5 illustrates a stress distribution diagram of the tire integrated with an electronic device according to the other embodiment of the invention.

FIG. 4 is a view illustrating a tire integrated with an electronic device according to another embodiment of the invention, and FIG. 5 illustrates a stress distribution diagram of the tire integrated with an electronic device according to the other embodiment of the invention.

On the other hand, as illustrated in FIGS. 4 and 5, a tire 200 integrated with an electronic device according to the other embodiment includes an inner liner 210, an electronic device 220, a bead filler 230, a bead wire, and a side wall 250.

Here, the electronic device 220 can be attached to an outer side of an end 231 of the bead filler, when the bead filler 230 has a length of shorter than 30 mm.

At that time, the electronic device 220 can be attached at a height of 200% to 500% from an end 240 of the bead wire of the tire at which the contact shear strength is the lowest. Alternatively, the electronic device 220 can be attached at a height of 40 mm to 50 mm from the end 240 of the bead wire of the tire.

The electronic device 220 can be extended to an end portion of the side wall 250 to be attached thereto and can be attached on a tread.

Here, in order to secure a recognition distance, the electronic device 220 can be provided not to be attached beyond a start end of a second belt.

Regarding the electronic device (120 or 220) provided as described above, since the electronic device (120 or 220) is not inserted between a carcass and the side wall (150 or 250) inside the tire, there is no concern about a durability reduction of the tire or malfunction of the electronic device (120 or 220) due to deformation of the tire.

Hereinafter, a specific manufacturing method of the tire 100 integrated with an electronic device will be described.

Figure 6:
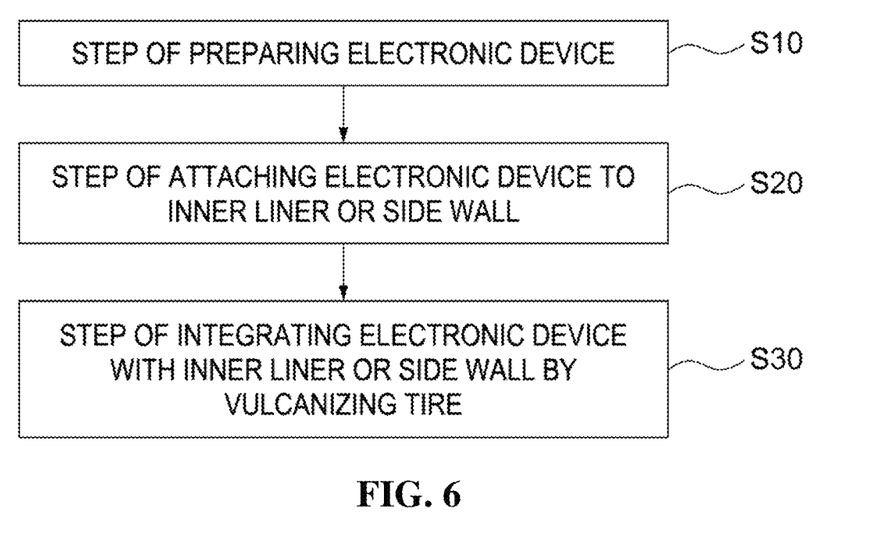
FIG. 6 is a flowchart of a manufacturing method of the tire integrated with an electronic device according to still another embodiment of the invention.

FIG. 6 is a flowchart of the manufacturing method of the tire integrated with an electronic device according to still another embodiment of the invention.

As illustrated in FIG. 6, the manufacturing method of the tire integrated with an electronic device includes Step S10 of preparing the electronic device, Step S20 of attaching the electronic device to the inner liner or the side wall, and Step S30 of integrating the electronic device with the inner liner or the side wall by vulcanizing the tire.

Figure 7:
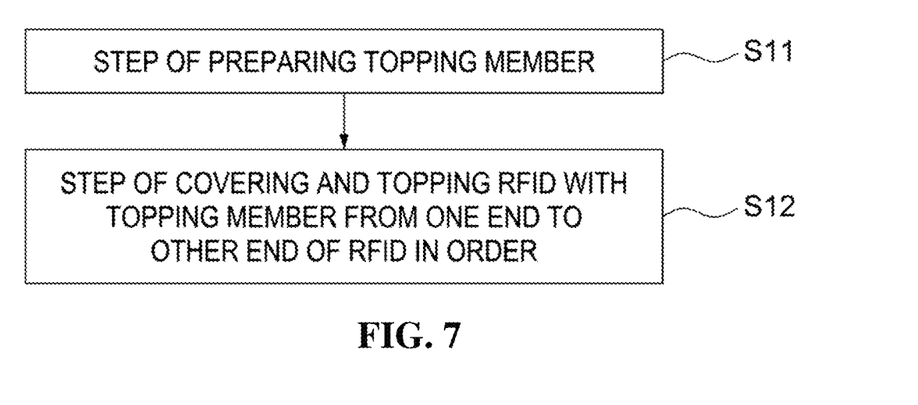
FIG. 7 is a flowchart of a step of preparing the electronic device according to the other embodiment of the invention.

FIG. 7 is a flowchart of a step of preparing the electronic device according to the other embodiment of the invention.

As illustrated in FIG. 7, in Step S10 of preparing the electronic device, Step S11 of preparing the topping member can be first performed.

In Step S11 of preparing the topping member, the topping member can be made of the same material as that of a portion at which the electronic device 120 is attached, or the topping member can be made of a polymer material.

Specifically, when the electronic device 120 is attached to the inner liner 110, the topping member can be made of the same material as that of the inner liner 110 or a polymer material. Besides, when the electronic device 120 is attached to the side wall 150, the topping member can be made of the same material as that of the side wall 150 or a polymer material.

The topping member provided as described above enables the electronic device 120 to be more firmly integrated with the tire during vulcanization.

After Step S11 of preparing the topping member, Step S12 of covering and topping the RFID with the topping member from one end to the other end of the RFID in order can be performed.

In Step S12 of covering and topping the RFID with the topping member from one end to the other end of the RFID in order, a total length of the RFID including an antenna and a chip having a thickness of 1 mm can be 10 cm or shorter. Besides, the RFID can be provided to be completely covered with the topping member not to project outside the topping member.

In particular, in Step S12 of covering and topping the RFID with the topping member from one end to the other end of the RFID in order, the RFID is covered and topped with the topping member from the one end to the other end of the RFID in order, and thereby it is possible to prevent air from being contained between the topping member and the chip.

After Step S10 of preparing the electronic device, Step S20 of attaching the electronic device to the inner liner or the side wall can be performed.

In Step S20 of attaching the electronic device to the inner liner or the side wall, the electronic device can be attached at a portion of the inner liner 110 or the side wall 150 at which contact shear strength is the lowest.

Figure 8:
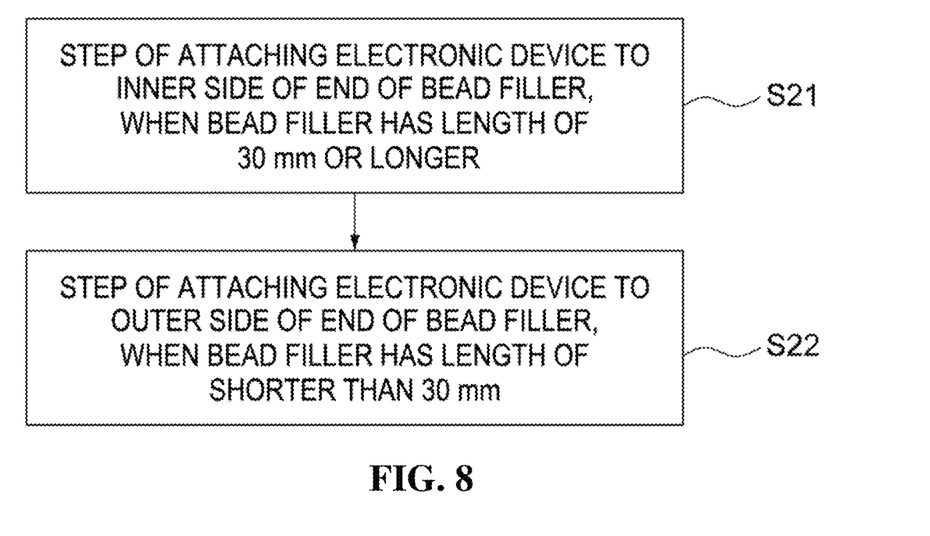
FIG. 8 is a flowchart of a step of attaching the electronic device to an inner liner or a side wall according to the other embodiment of the present invention.

FIG. 8 is a flowchart of a step of attaching the electronic device to the inner liner or the side wall according to the other embodiment of the present invention.

More specifically, as illustrated in FIG. 8, in Step S20 of attaching the electronic device to the inner liner or the side wall, first, Step S21 of attaching the electronic device to the inner side of the end of the bead filler when the bead filler has a length of 30 mm or longer can be performed.

In Step S21 of attaching the electronic device to the inner side of the end of the bead filler when the bead filler has a length of 30 mm or longer, the electronic device 120 can be attached at a height of 45% to 85% from the end 140 of the bead wire of the tire. Alternatively, the electronic device can be attached at a height of 15 mm to 26 mm from the end 140 of the bead wire of the tire.

After Step S21 of attaching the electronic device to the inner side of the end of the bead filler when the bead filler has a length of 30 mm or longer, Step S22 of attaching the electronic device to the outer side of the end of the bead filler when the bead filler has a length of shorter than 30 mm can be performed.

In Step S22 of attaching the electronic device to the outer side of the end of the bead filler when the bead filler has a length of shorter than 30 mm, the electronic device 120 can be attached at a height of 200% to 500% or at a height of 40 mm to 50 mm from the end 140 of the bead wire of the tire.

After Step S20 of attaching the electronic device to the inner liner or the side wall, Step S30 of integrating the electronic device to the inner liner or the side wall by vulcanizing the tire can be performed.

According to the manufacturing method of the tire 100 integrated with the electronic device provided as described above, the electronic device 120 can be attached to and integrated with a manufactured tire or a tire in a partly manufactured state, and thus the manufacturing method is conveniently used since there is no need to change a manufacturing process.

In addition, according to the invention, when the electronic device 120 is attached to the inner liner 110, and a problem of durability reduction of the tire arises, a tire pressure monitoring system makes it easy to cope with the problem of durability reduction.

On the other hand, although not illustrated, the electronic device 120 can be attached inside the tire by vulcanization at a molding step.

The invention according to the configurations described above has the following effects. Since it is possible to attach and integrate an electronic device to and with a manufactured tire or a tire in a partly manufactured state, there is no need to change a manufacturing process.

In addition, according to the invention, since the electronic device is not inserted between a carcass and a side wall inside a tire, there is no concern about a durability reduction of the tire or malfunction of the electronic device due to deformation of the tire.

In addition, according to the invention, when the electronic device is attached to an inner liner, and a problem of the durability reduction of the tire arises, a tire pressure monitoring system makes it easy to cope with the problem of the durability reduction.

The effects of the invention are construed not to be limited to the above-mentioned effects but to include every effect that can be derived from the configurations of the invention described in the detailed description of the embodiments or claims of the invention.

The description of the invention described above is provided as an example, and a person of ordinary skill in the art to which the invention belongs can understand that it is possible to easily modify the invention to another embodiment without altering the technical idea or an essential feature of the invention. Therefore, the embodiments described above need to be understood as exemplified embodiments in every aspect and not as embodiments to limit the invention. For example, configurational elements described in a singular form can be realized in a distributed manner. Similarly, the configurational elements described in the distributed manner may be realized in a combined manner.

The scope of the invention needs to be represented by the claims to be described below, and meaning and the scope of the claims and every modification or modified embodiment derived from an equivalent concept of the claims need to be construed to be included in the scope of the invention.

What is claimed is:

1. A tire integrated with an electronic device, comprising:
   the electronic device attached to an inner liner or a side wall of the tire by vulcanization,
   wherein the electronic device is attached to an inner side or an outer side of an end of a bead filler depending on a length of the bead filler,
   wherein the electronic device has a RFID surrounded by a topping member, and
   wherein the topping member is made of a same material as that of a portion at which the RFID is attached, or the topping member is made of a polymer material.

2. A tire integrated with an electronic device, comprising:
   the electronic device attached to an inner liner or a side wall of the tire by vulcanization,
   wherein the electronic device is attached to an inner side or an outer side of an end of a bead filler depending on a length of the bead filler,
   wherein the electronic device is attached at a portion of the inner liner or the side wall where contact shear strength is the lowest.

3. The tire integrated with the electronic device according to claim 2,
   wherein the electronic device is attached to the inner side of the end of the bead filler, when the bead filler has a length of 30 mm or longer.

4. The tire integrated with the electronic device according to claim 3,
   wherein the electronic device is attached at a height of 45% to 85% from an end of a bead wire of the tire.

5. The tire integrated with the electronic device according to claim 2,
   wherein the electronic device is attached at the outer side of the end of the bead filler, when the bead filler has a length of shorter than 30 mm.

6. The tire integrated with the electronic device according to claim 5,
   wherein the electronic device is attached at a height of 200% to 500% from an end of a bead wire of the tire.

7. A manufacturing method of a tire integrated with an electronic device, comprising:
   a) preparing the electronic device;
   b) attaching the electronic device to an inner liner or a side wall of the tire; and
   c) integrating the electronic device with the inner liner or the side wall by vulcanizing the tire,
   wherein the electronic device is attached to an inner side or an outer side of an end of a bead filler depending on a length of the bead filler,
   wherein, the step of a) includes:
   a1) preparing a topping member; and
   a2) covering and topping a RFID with the topping member from one end to another end of the RFID in order,
   wherein the topping member is made of a same material as that of a portion at which the RFID is attached, or the topping member is made of a polymer material.

8. The manufacturing method of the tire integrated with the electronic device according to claim 7,
   wherein, in the step of b), the electronic device is attached at a portion of the inner liner or the side wall where contact shear strength is the lowest.

9. The manufacturing method of the tire integrated with an electronic device according to claim 8,
   wherein the step of b) includes:
   b1) attaching the electronic device to the inner side of the end of the bead filler, when the bead filler has a length of 30 mm or longer; and
   b2) attaching the electronic device to the outer side of the end of the bead filler, when the bead filler has a length of shorter than 30 mm.

10. The manufacturing method of the tire integrated with the electronic device according to claim 9,
    wherein, in the step of b1), the electronic device is attached at a height of 45% to 85% from an end of a bead wire of the tire.

11. The manufacturing method of the tire integrated with the electronic device according to claim 9,
    wherein, in the step of b2), the electronic device is attached at a height of 200% to 500% from an end of a bead wire of the tire.

* * * * *